F. DE VAUX.
FRICTION DRIVE ATTACHMENT FOR BICYCLES.
APPLICATION FILED OCT. 11, 1915.

1,191,287.

Patented July 18, 1916.

WITNESSES
C. E. Lodge
Wm H. Norman

INVENTOR
Frank DeVaux

BY F. C. Bates
HIS ATTORNEY.

UNITED STATES PATENT OFFICE.

FRANK DE VAUX, OF SAN JOSE, CALIFORNIA, ASSIGNOR OF ONE-THIRD TO WILLIAM H. SLIGER, OF STOCKTON, CALIFORNIA.

FRICTION DRIVE ATTACHMENT FOR BICYCLES.

1,191,287.  Specification of Letters Patent.  Patented July 18, 1916.

Application filed October 11, 1915. Serial No. 55,220.

*To all whom it may concern:*

Be it known that I, FRANK DE VAUX, a citizen of the Republic of France, residing at San Jose, in the county of Santa Clara and State of California, have invented certain new and useful Improvements in Friction Drive Attachments for Bicycles, of which the following is a specification.

My invention relates to friction drive attachment for bicycles, and is primarily intended for use in connection with bicycles; the same may also be used in any place where a friction drive attachment of the class described is desired in connection with other machinery.

The objects of my invention are: 1st, to provide a friction drive attachment of the character indicated that can be attached to a bicycle frame, for the purpose of propelling said bicycle. 2nd, that will be simple in construction, cheap to manufacture, easily attached to a bicycle frame, and one in which the power will be sufficient to drive any bicycle to which the same may be attached.

Figure 1:
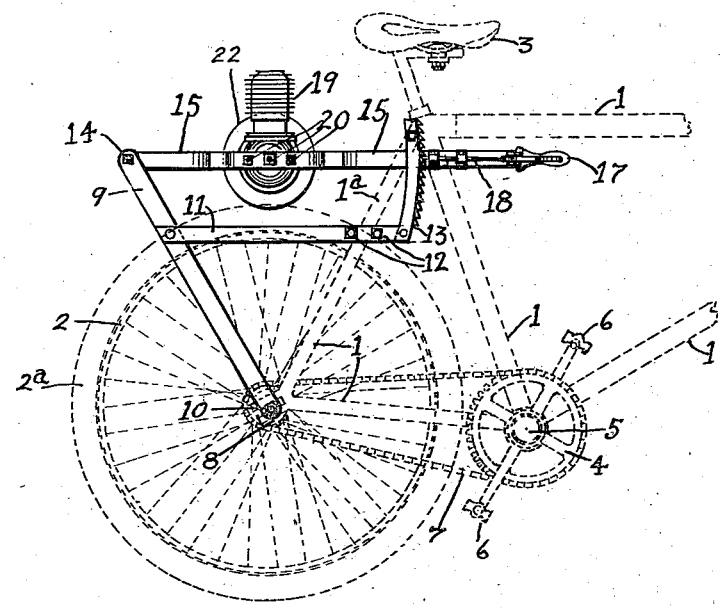
Figure 2:
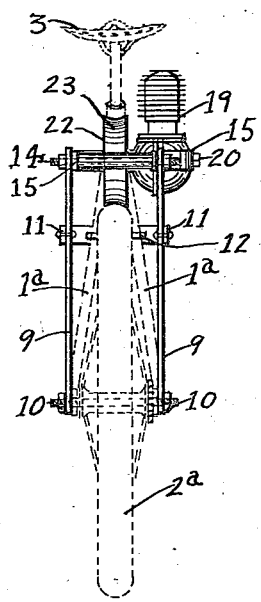
Figure 3:
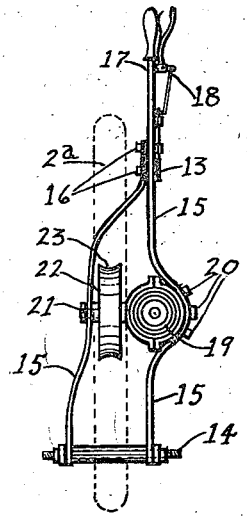

For a full understanding of the invention and the merits thereof, reference is to be had to the following description and accompanying drawings, in which:

Figure 1 is a side view of a bicycle with my friction drive attachment in place thereon, parts broken away. Fig. 2 is an end view of Fig. 1. Fig. 3 is a plan view of the friction drive attachment showing engine in place.

Corresponding and like parts are referred to in the following description and indicated in all the views of the drawings by the same reference characters.

Referring now more particularly to the drawings, 1 indicates the frame of a bicycle to which my invention is attached, 2 is the rear wheel attached to said frame 1, $2^a$ is the tire attached to said wheel 2, 3 is the seat attached to frame 1, 4 is the sprocket wheel connected to frame 1 by pivot bearing 5, 6 is the foot treadles connected to sprocket wheel 4, 7 is the sprocket chain connecting sprocket wheel 4 with sprocket wheel 8, the same being fastened to wheel 2 for the purpose of propelling the same by foot power.

My invention consists of rear bars 9 their lower ends connecting with the rear wheel axle of a bicycle as shown at 10. The same extend upward and rearward a distance to which is fastened longitudinal brace bars 11; said bars 11 extend forward and are fastened to upright braces $1^a$ of the bicycle frame 1 by bolts 12. At the forward end of one of said bars 11 and fastened thereto is an upright notched bar 13, the upper end of said notched bar being fastened to braces $1^a$ of the bicycle frame 1.

At the upper end of bars 9 and fulcrumed thereto by fulcrum pin 14 are lever bars 15, said lever bars 15 being formed to shape as shown in Fig. 3, and are fastened together by bolts 16.

At the outer end of said bars 15 is handle 17, to which is fastened spring latch 18, the same being adapted to engage notched bar 13. Positioned between said bars 15 is gas engine 19, the same being fastened to lever bars 15 by bolts 20 and shaft bearing 21. The fly-wheel of said gas engine 19 is shown at 22, the same having a concave face 23, adapted to engage the outer surface of tire $2^a$ of wheel 2 when lever bars 15 are carried downward bringing said fly-wheel in friction contact with tire $2^a$, the same being held in place by notched bar 13 and spring latch 18, and vice versa when said friction contact is required to be taken off of said tire $2^a$.

The operation of my friction drive attachment for bicycles is as follows: The bicycle is first started by the use of the foot treadles. When well under way the levers 15 are lowered by releasing spring latch 18 from notched bar 13, which brings the concave face 23 of fly-wheel 22 in friction contact with tire $2^a$, and starts the gas engine 19 which drives the bicycle forward at the required speed; the raising of lever bars 15 disconnects said fly-wheel from friction contact with said tire $2^a$.

Having thus described my invention, what I claim as new and desire to secure by Letters Patent, is:

1. In a device of the character described, comprising rear bars 9 connecting at their lower ends with bicycle wheel axle 10, said bars 9 extending upward and rearward a distance, longitudinal brace bars 11 fastened to said bars 9, said brace bars 11 extending a distance forward, and means by which the same are fastened to upright braces $1^a$ of the bicycle frame 1, an upright notched bar and means of fastening the same to longitudinal bars 11, and braces $1^a$ of bicycle frame 1, lever bars 15, and means by which the same are connected to bars 9 and upright notched bar 13, means by which said lever bars 15 are connected together at their outer ends, as shown and described.

2. In a friction drive attachment for bicycles, the combination of rear bars 9 connecting with the rear wheel axle of a bicycle, longitudinal brace bars 11 fastened thereto, means by which said longitudinal bars 11 are fastened to a bicycle frame, an upright notched bar, and means by which said notched bar is fastened to said longitudinal bars and to said bicycle upright bars 1a, lever bars 15 fulcrumed to the upper end of rear bars 9, a gas engine positioned between said lever bars 15, and means by which the same is fastened thereto, the fly-wheel of said gas engine having the face thereof concaved, adapted to engage the outer surface of a bicycle tire and drive said bicycle by friction contact, as shown and described.

In testimony whereof I have hereunto affixed my signature in presence of two subscribing witnesses.

FRANK DE VAUX.

Witnesses:
C. E. LODGE,
C. W. DAVISON.